Jan. 10, 1928.　　　　　E. E. HEINTZ ET AL　　　1,655,696
WINDOW REGULATOR
Filed April 26, 1926　　2 Sheets-Sheet 1
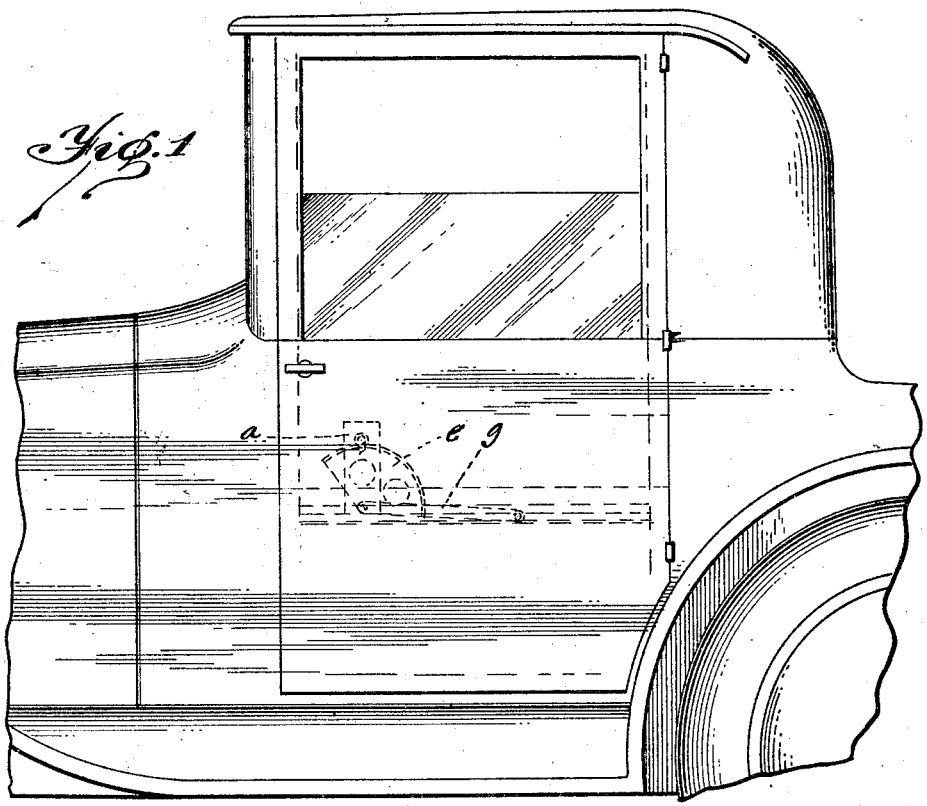
Fig. 1
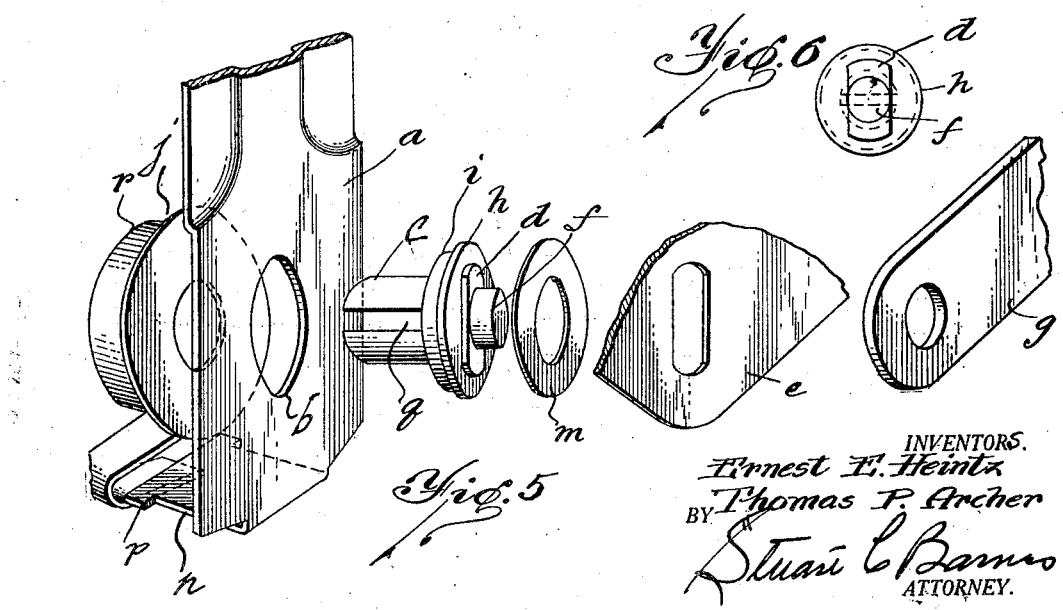
Fig. 6
Fig. 5
INVENTORS.
Ernest E. Heintz
Thomas P. Archer
BY
Stuart C. Barnes
ATTORNEY.

Jan. 10, 1928.
E. E. HEINTZ ET AL
1,655,696
WINDOW REGULATOR
Filed April 26, 1926    2 Sheets-Sheet 2
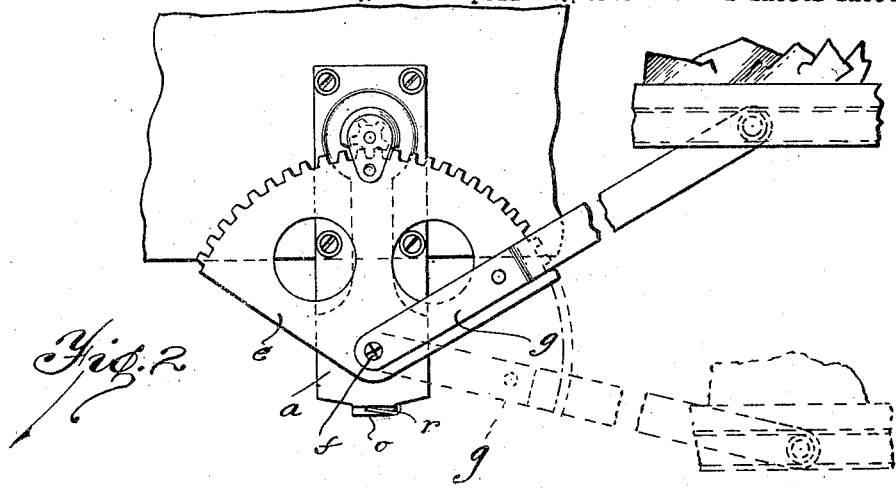
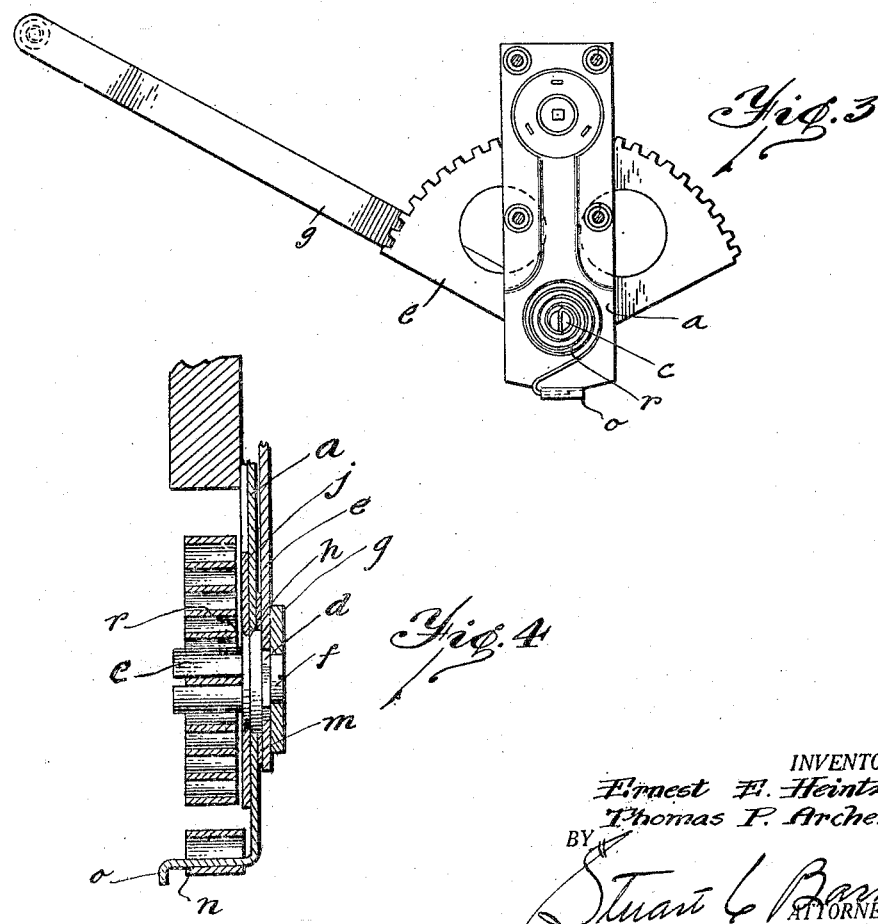
INVENTORS
*Ernest E. Heintz*
*Thomas P. Archer*
BY
*Stuart C. Barnes*
ATTORNEY.

Patented Jan. 10, 1928.

1,655,696

UNITED STATES PATENT OFFICE.

ERNEST E. HEINTZ AND THOMAS P. ARCHER, OF DETROIT, MICHIGAN, ASSIGNORS TO TERNSTEDT MANUFACTURING CO., OF DETROIT, MICHIGAN, A CORPORATION OF MICHIGAN.

WINDOW REGULATOR.

Continuation in part of application Serial No. 722,659, filed June 27, 1924. This application filed April 26, 1926. Serial No. 104,513.

This invention relates to window regulators, and especially a window regulator of the lever type. This invention is a continuation in part of our application Serial No. 722,659 filed June 27th, 1924.

The claims in the present application are limited to the counterbalancing spring construction and the bearing for the structure.

It is the object of the present invention to provide a mounting for the counterbalancing spring and a bearing for the swinging parts which effectively functions, and which may be very economically made on a large production basis.

In the drawings:

Fig. 1 is a view in elevation of an automobile body equipped with our improved regulator.

Fig. 2 is a fragmentary view of the lockboard, showing the regulator in place.

Fig. 3 is an elevation of the reverse side of the regulator.

Fig. 4 is a section through the regulator adjacent the counterbalancing spring.

Fig. 5 is a composite view showing how the parts are assembled together at the lower end of the regulator plate.

Fig. 6 is an end elevation of the journal stud.

A regulator plate is designated $a$, and is channeled not only down through the center, but as the lower end is shown in Fig. 3. The lower inset or channel portion is punched out to form a journal bearing opening $b$, adapted to take the journal stud $c$, which may be either a screw machine product or a stamping. This stud is provided with a separate key portion $d$ adapted to fit in a key slot in the gear segment $e$ provided with a stud portion $f$, adapted to be riveted to the regulator arm $g$ by an "X" punching operation, as shown in Fig. 2. The journal stud is provided with a bearing collar $h$ which fits into the journal bearing $b$ of the regulator plate $a$. It is provided with a second washer-carrying collar $i$, of slightly less diameter, which carries the washer $j$ which is engaged with the collar by a press fit, or preferably by a slight upsetting or riveting operation on the collar as at $r$. This ties the journal stud to the washer and the washer becomes a retaining member that lies directly up against the back of the regulator plate to prevent the shifting of the stud longitudinally through the plate. The washer prevents shifting one way and the gear segment and the arm prevent shifting the other way. This ties the parts together and tightens them up so that they cannot rattle. Preferably a brass washer $m$ is laid between the front of the regulator plate and the segment to receive whatever friction there is between the two parts in turning, and to prevent corrosion between the two.

The lower end of the regulator plate is provided with a turned-over flange $n$ which is bent over to form a lip $o$ at its edge to strengthen the flange. This flange forms a spring abutment. It will be noted that the lip portion extends out beyond the ends of the flange to provide retaining lugs $p$, which hold the spring in place after it has been snapped therein. The inner end of the spring fits into the slot $q$ in the end of the stud. By simply reversing the spring it will be obvious that the same parts can be used for a right or left hand regulator by simply riveting the lifting arm to the opposite side of the sector gear and turning this member over.

This makes a very convenient assembly. In the first place the stud lends itself very nicely to large production. The stud may be made on an automatic screw machine or, conceivably, the several parts could be in the form of stampings united together in the journal assembly. The outer surface of the spring approaches a flush position with respect to the inner face of the regulator plate. This enables the counterbalancing spring to be carried below the lockboard so no cutting of the lockboard is required. It also results in the lifting arm being on one side of the regulator plate and the counterbalancing spring on the other side, but no claim is made to this as this has been a common thing in window lifts of the counterbalance type for years.

The improvement resides in causing the retaining member to lie directly against the regulator plate on one side while the sector or lifting arm lies against the regulator plate on the other side, leaving a stud over which the counterbalancing spring may be freely mounted, thus tightly clamping the parts to opposite sides of the regulator plate but leaving the counterbalancing spring completely free of such clamp. The second improvement resides in the seat for the outer end of the counterbalancing spring, which is formed by simply punching and turning out the flange in place of providing a second separate pin which requires a separate riveting operation to set it in place. Furthermore the spring abutment flange is very nicely adapted to do its work, for it has the turned-over lip to strengthen it and the projecting lugs form a seat that is calculated to hold the spring in place and from slipping off.

What we claim is:

1. In a window regulator, the combination of a regulator plate having a journal opening in one end, a stud rotatably supported in the journal opening, lifting means a portion of which is secured on one end of the stud to turn therewith, the journal portion of the stud passing through the journal opening, a retaining member secured to the stud adjacent the back of the regulator plate to hold the parts tightly together and prevent axial shifting of the stud, the said stud provided with a slot in its rear end, and a counterbalancing spring coiled around such end of the stud and having one end fitted into said slot and its other end anchored to the plate, said spring located to the outside of said retaining member.

2. In a window regulator, the combination of a regulator plate having a journal opening in one end, a stud rotatably supported in the journal opening, lifting means a portion of which is secured on one end of the stud to turn therewith, the journal portion of the stud passing through the journal opening, a retaining member secured to the stud back of the regulator plate to hold the parts tightly together and prevent axial shifting of the stud, the said stud provided with a slot at its rear end, and a counterbalacing spring coiled around such end of the stud to the outside of the retaining member and having one end fitted into said slot and its other end anchored to the plate, the said regulator plate provided with a punched out and turned-over flange to effect this anchor.

3. In a regulator, the combination of a regulator plate provided at one end with a journal opening, a stud passing through the journal opening and having on one end a seating portion, window lifting means a portion of which is secured to this seating portion to turn therewith, the said stud being provided with a collar or journal portion that passes through the journal opening and is rotatable therein, said stud also having a second collar portion immediately beyond the first collar portion and means on its other end to receive one end of a counterbalancing spring, a washer secured on said second collar portion of the stud and arranged to bear against the rear of the regulator plate to hold the parts tightly together, and a counterbalancing spring secured around the stud back of the washer and having its one end secured to said stud and the other end anchored to the regulator plate.

4. In a window regulator, a regulator plate provided with an opening in one end, a stud passing through the opening, lifting means a portion of which is secured to one end of the stud, a counterbalancing spring secured to the other end of the stud, the regulator plate being provided with a turned-out flange over which the outer end of the spiral counterbalancing spring is anchored.

5. In a window regulator, a regulator plate provided with an opening in one end, a stud passing through the opening, lifting means having a portion thereof secured to one end of the stud, a counterbalancing spring secured to the other end of the stud, the regulator plate being provided with a turned-out flange over which the outer end of the spiral counterbalancing spring is anchored, said turned-out flange having a turned-over strengthening lip.

6. In a window regulator, a regulator plate provided with an opening in one end, a stud passing through the opening, lifting means having a portion thereof secured to one end of the stud, a counterbalancing spring secured to the other end of the stud, the regulator plate being provided with a turned-out flange over which the outer end of the spiral counterbalancing spring is anchored, said turned-out flange having one or more projecting lugs to hold the end of the counterbalancing spring anchored in place.

7. In a window regulator, a regulator plate provided with an opening in one end, a stud passing through the opening, lifting means having a portion thereof secured to one end of the stud, a counterbalancing spring secured to the other end of the stud, the regulator plate being provided with a turned-out flange over which the outer end of the spiral counterbalancing spring is anchored, the said turned-over flange provided with a turned-down lip and with one or more projecting spring-end retaining lugs.

8. In a window regulator, the combination of a regulator plate provided in one end with a journal opening, a journal member rotatably supported in the journal opening, lifting means having a portion thereof carried on one end of the journal and on one side of the plate, means to the rear of the plate connected with the journal for preventing the shifting of the journal, and a counterbalancing spring secured to the other end of the journal, and to the outside of such restraining means.

9. In a window regulator, the combination of a plate provided with a journal opening, a journal rotatably supported in the journal opening, a lifting means having a portion thereof on one end of the journal and on one side of the plate, a washer connected with the lifting arm through the journal, and a counterbalancing element supported on the outside of the washer and on the other end of the journal, the journal having an open slot to receive one end of the counterbalancing spring.

10. In a window regulator, the combination of a regulator plate, lifting means, a spiral spring for counterbalancing the lifting means having its inner end coupled up with part of the lifting means and having an outer end, the said regulator plate provided with a turned-over flange arranged to support the outer end of the spring on either end of the flange to make the spring reversible and the regulator reversible.

11. In a window regulator mechanism, a sheet metal support, a sheet metal sector in close juxtaposition to one side of said support, a retaining member connected to said sector and lying against the opposite side of said support, thereby to hold said sector against lateral displacement, and a spring connected to be tensioned by movement of said sector in one direction, the outer surface of said spring being substantially flush with the inner surface of said support.

12. In a window regulator, a rocking journal stud comprising a screw machine product forming a lifting arm seat, a gear sector key, a journal collar, a restraining washer seat, and a counterbalancing spring-end-fastener located in order from one end to the other.

13. In a window regulator, a stud comprising at one end a seat for carrying a lifting arm and a gear sector and the opposite end having a slot to receive a counterbalancing spring end, said slot opening both through the periphery at opposite sides of the stud and the end of the stud.

In testimony whereof we have affixed our signatures.

ERNEST E. HEINTZ.
THOMAS P. ARCHER.